United States Patent [19]

Hans et al.

[11] Patent Number: 4,532,034
[45] Date of Patent: Jul. 30, 1985

[54] CONTINUOUSLY OPERATING SEPARATING APPARATUS FOR THE SEPARATION OF MIXTURES OF LIGHT AND HEAVY LIQUID COMPONENTS

[75] Inventors: Lindqvist Hans, Nikkilä; Grönberg Vidar, Järvenpää, both of Finland

[73] Assignee: Linotek, Oy, Järvenpää, Finland

[21] Appl. No.: 568,247

[22] Filed: Jan. 4, 1984

[30] Foreign Application Priority Data

Jan. 11, 1983 [FI] Finland ................................ 830097

[51] Int. Cl.³ ............................................ B01D 21/26
[52] U.S. Cl. .................................. 210/112; 210/512.1; 210/522; 210/539
[58] Field of Search ............... 210/788, 800, 802, 803, 210/95, 304, 512.1, 512.2, 744, 497.3, 541, 542, 522, 534, 537, DIG. 5, 787, 539, 112

[56] References Cited

U.S. PATENT DOCUMENTS

| | | |
|---|---|---|
| 416,048 | 11/1889 | Brickenstein et al. |
| 1,030,271 | 6/1912 | Arbuckle .................. 210/542 |
| 1,940,794 | 12/1933 | Fisher ........................ 210/522 |
| 2,981,413 | 4/1961 | Fitch ....................... 210/512.1 |
| 3,250,394 | 5/1966 | Clark ........................ 210/522 |
| 3,444,077 | 5/1969 | Finch ...................... 210/512.1 |
| 3,794,167 | 2/1974 | Olgard et al. ............ 210/802 |
| 4,146,471 | 3/1979 | Wyness ..................... 210/788 |
| 4,299,703 | 11/1981 | Bezard et al. ........... 210/512.1 |
| 4,346,005 | 8/1982 | Zimmerman .............. 210/232 |
| 4,371,382 | 2/1983 | Ross ......................... 210/788 |
| 4,425,239 | 1/1984 | Jacocks et al. .......... 210/802 |

FOREIGN PATENT DOCUMENTS

| | | |
|---|---|---|
| 597301 | 5/1934 | Fed. Rep. of Germany ...... 210/522 |
| 861692 | 1/1953 | Fed. Rep. of Germany. |
| 3018660 | 5/1980 | Fed. Rep. of Germany. |
| 362726 | 6/1980 | Fed. Rep. of Germany. |
| 1341018 | 9/1962 | France ....................... 210/522 |
| 38752 | 4/1981 | United Kingdom. |
| 753445 | 8/1980 | U.S.S.R. ................... 210/512.1 |

Primary Examiner—Barry S. Richman
Assistant Examiner—Titus B. Ledbetter, Jr.
Attorney, Agent, or Firm—Bell, Seltzer, Park & Gibson

[57] ABSTRACT

Continuously operating separating apparatus for the separation of mixtures of light and heavy liquid components, which apparatus comprises
- a mixing portion, which is located in the middle portion of said apparatus and which comprises a mixing vessel and a cylinder placed in the middle of said mixing vessel, and
- a separating portion, which is located in the upper portion of said apparatus and which comprises two or more cones placed one inside the other, and
- a circulating pump, which is connected by means of two or more conduits tangentially to said mixing vessel, and
- a bottom portion, and
- a feed conduit, which is connected tangentially to the upper portion of said mixing vessel, and
- discharge members located in the upper portion of said apparatus, said discharge members comprising an overflow member and discharge outlets, through which the light liquid fraction is discharged, and
- a substantially vertical discharge member placed in the middle of said apparatus, through which member the heavy liquid fraction is discharged.

9 Claims, 4 Drawing Figures

CONTINUOUSLY OPERATING SEPARATING APPARATUS FOR THE SEPARATION OF MIXTURES OF LIGHT AND HEAVY LIQUID COMPONENTS

The present invention is concerned with a continuously operating separating apparatus for the separation of mixtures of light and heavy liquid components which apparatus comprises
- a mixing portion, which is located in the middle portion of said apparatus and which comprises a mixing vessel and a cylinder placed in the middle of said mixing vessel, whereat said mixing vessel and said cylinder constitute the mixing zone, and
- a separating portion, which is located in the upper portion of said apparatus and which comprises two or more cones placed one inside the other, whereat said cones constitute the separating zone, and
- a circulating pump, which is connected by means of two or more conduits tangentially to said mixing vessel, and
- a bottom portion, and
- a feed conduit, which is connected to the upper portion of said mixing vessel tangentially, and
- discharge members located in the upper portion of said apparatus, said discharge members comprising an overflow member and discharge outlets, through which the light liquid fraction is discharged, and
- a substantially vertical discharge member placed in the middle of said apparatus, through which member the heavy liquid fraction is discharged.

The separating apparatus may also be provided with a discharge member extending to the bottom of said apparatus, the solid matter sinking to the bottom part being discharged through said discharge member.

The invention is also concerned with a method for the separation of mixtures comprising dispersions of liquids of different densities wherein the mixture is fed tangentially into the mixing zone of the separating apparatus, in which zone the mixture is circulated tangentially by means of a pump between the cylinder placed in the middle of said apparatus and the mantle of the mixing vessel, whereat the lighter liquid phase rises into the separation zone located in the upper portion of said separating apparatus and comprising two or more cones placed one inside the other, and is discharged as overflow from the upper portion of said apparatus, whereas the heavier liquid phase is discharged through the cylinder and the discharge member placed in the middle of the cylinder.

The diameter of the cylinder 5 is ½ to 1/5 of the diameter of the mixing vessel 4, preferably ⅓ to 1/5 of the diameter of said vessel.

This invention was conceived and perfected in connection with research involving the separation of tall oil from tall oil skimmings. It will be described in reference to said separation, with the understanding that it is capable of broader application, being applicable to the separation of any mixture comprising liquid components having different densities.

More particularly, the invention is concerned with a method for the separation of tall oil and similar products from an acid tall oil soap mixture which contains 20 to 55% of tall oil, 45 to 80% of mother liquid, whose pH is 2 to 3.5, and less than 10% of lignin, as well as varying quantities of gypsum, whereby said mixture is fed at a rate of 1,000 to 10,000 kg/hour tangentially into the mixing zone of the separating apparatus, in which the mixture is circulated tangentially by means of a pump between the cylinder placed in the middle of the apparatus and the mantle of the mixing vessel at a rate of 10 to 100 $m^3$ per hour, whereat the lignin is dispersed in the mother liquid, and the tall oil, being of lower weight, rises into the separating zone located in the upper portion of said apparatus and consisting of conical discs placed one inside the other, and is discharged as overflow from the top portion of said apparatus, whereas the mother liquid and the lignin dispersed in same are discharged through the cylinder and the discharge pipe placed in the middle of the cylinder.

From the U.S. Pat. No. 2,838,481, a method is known for the separation of tall oil and similar products by treating a dilute tall oil soap solution obtained by adding water and acid to tall oil skimmings in a high-performance agitator and by recovering the hydrolyzed products. In the recovery, a centrifuge is used. The apparatus also includes a continuously vibrating strainer, whose function is, among other things, to separate any cellulose fibres interfering with the centrifuging operation.

Another common method for the recovery of a product of hydrolysis is decanting. In such a case, the apparatus is, however, very large, the cleaning is laborious, and, moreover, the interval between cleanings is short, and the separation takes place slowly.

Now, a novel separating apparatus has been invented, by means of which mixtures of light and heavy liquid components can be separated, such as mixtures containing tall oil and similar products, can be separated efficiently.

By means of the apparatus in accordance with the invention, it is possible to treat all types of dispersions of oil and water, such as oil-containing waters, in particular oil-containing sewage waters, and also oily and aqueous sludges, such as sewage waters that contain sludge.

Said new apparatus has the following advantages as compared with the apparatus including a centrifuge, described in the U.S. Pat. No. 2,838,481:
- the new apparatus is simpler and it has no moving parts,
- when the new apparatus is used, the consumption of energy and the forces of friction are low, and
- the cleaning of the new apparatus is easy, and, moreover, the intervals between cleanings are long.

In the following, the invention will be described in more detail with the aid of the exemplifying embodiments, and the drawings, which are shown for purpose of illustration only.

Figure 1:
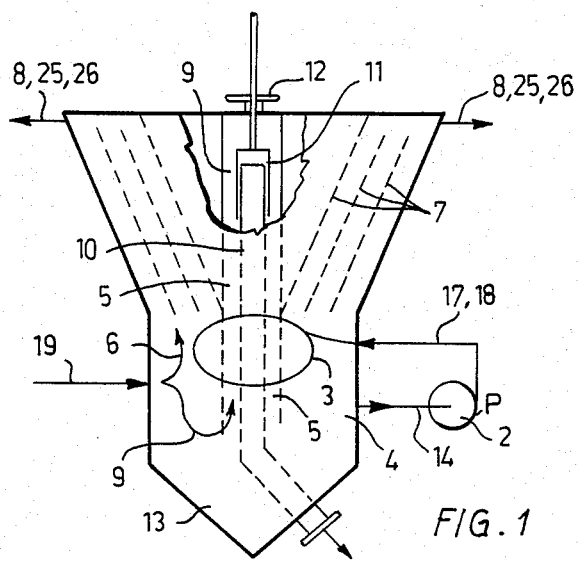
FIGS. 1 and 4 are schematical views of a separating apparatus in accordance with the invention.
Figure 2:
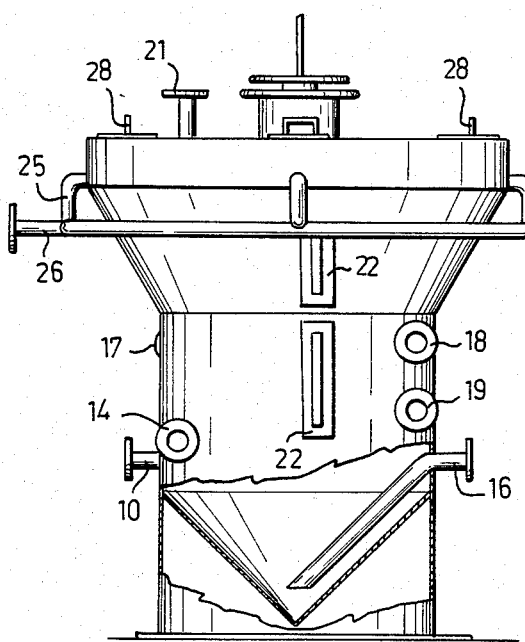
FIG. 2 shows a separating apparatus in accordance with the invention.
Figure 3:
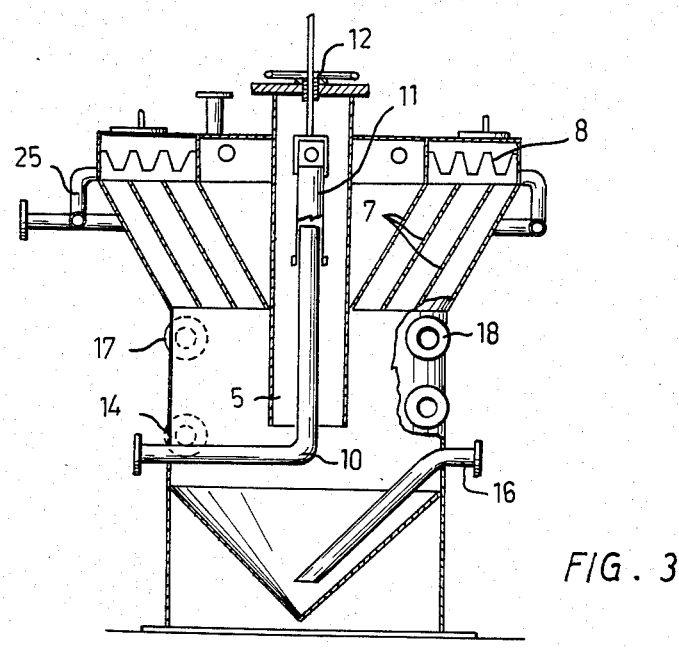
FIG. 3 is a vertical sectional view of a separating apparatus in accordance with the invention.

The separating apparatus in accordance with the invention comprises a mixing portion 3, which is located in the middle portion of said apparatus, and a separating portion, which is located in the upper portion of said apparatus, and a bottom portion 13, as well as means for feeding the mixture to be separated and means for discharging the separated products.

Said mixing portion 3, which is located in the middle portion of said apparatus comprises a mixing vessel 4, a vertical cylinder 5 located in the middle portion of said mixing vessel, a feed pipe 19 for the mixture to be separated, connected tangentially to said upper portion of said mixing vessel, and a circulating pump 2, which is connected tangentially to said middle portion of said mixing vessel by means of two or more circulating pipes 17, 18.

Said separating portion, which is located in the upper portion of said apparatus, comprises 2 to 10 cones 7 placed one inside the other, the distances between said discs being 50 to 200 mm and the angle of said cones being less than 90°, preferably about 60°, discharge members for the light component of the mixture, i.e. an overflow member 8 and collecting pipes 25 and discharge pipes 26, and a vent pipe 21.

The bottom portion 13 is preferably conical in shape and it is provided with a sediment discharge pipe 16.

The discharge member for the discharge of the heavy component of the mixture is located in the middle of said apparatus, partly inside the cylinder 5, said discharge member comprising a discharge pipe 10, a telescopic pipe 11 located in its upper portion, and an adjusting member 12 for said telescopic pipe. The mantle 4 of the mixing vessel is provided with one or several view glasses 22, and the cover of the separating portion is provided with several, preferably four, inspection holes 28.

According to the method in accordance with the invention, the mixture to be separated is passed into the mixing vessel located in the middle portion of the apparatus, into the mixing zone formed by the mantle 4 of the mixing vessel and of the cylinder 5 located in the middle of the mixing part, wherein the mixture is circulated intensively by means of the pump 2, as shown in (FIG. 1, arrow 3). Thereat, the light components of the mixture move upwards (FIG. 1, arrow 6), and the heavy components move downwards (FIG. 1, arrow 9). By adjusting the telescope pipe 11 by means of the adjusting member 12, it is possible to keep the interface between the phases at an appropriate level, which is 0 to 50 cm above the upper edge of the mixing portion. In the separating portion, the drops of the heavy phase are separated from the light phase very efficiently and flow down along the cones 7. The separated light phase is discharged as overflow via the discharge members 8, 25 and 26. The heavy phase rises into the funnel 5 and is discharged through the pipe 10.

Any gases and water vapour are discharged through the vent 21 located in the top portion of the apparatus.

Any heavy materials sinking to the bottom of the apparatus, such as gypsum, are discharged through a pipe 16 extending to the bottom of the apparatus.

Figure 4:
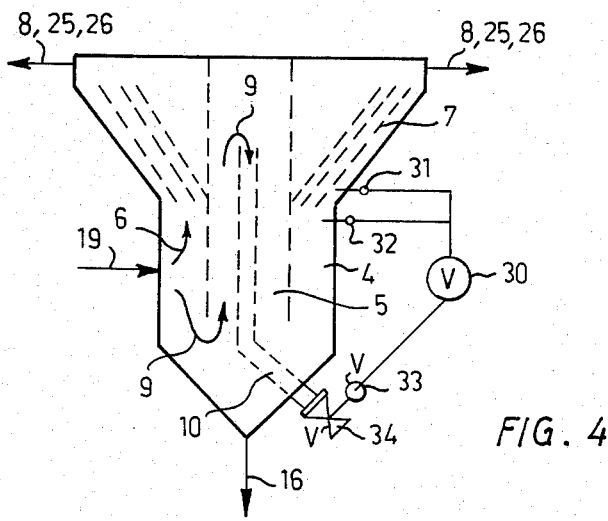

The removal of the heavy phase so that the interface between the light fraction and the heavy fraction remains at the level of 0 to 0.5 m above the upper edge of the mixing vessel is performed by means of an adjustable telescopic pipe 11 or by means of a control valve 30, 33 and 34 and by means of two or more limit switches 31 and 32 or by means of any other detector of the interface (FIG. 4).

The capacity of the separator apparatus is very high, the fed rate is between 1000 and 10,000 kg/hour, preferably between 1000 and 7,000 kg/hour, the volume of the mixing portion being between 1 and 5 m$^3$.

While one specific embodiment of the invention has been described in detail above, it is to be understood that various modifications may be made from the specific details described without departing from the spirit and scope of the invention.

The following examples illustrate the method in accordance with the invention.

EXAMPLE 1

Into a separating device having a volume of about 1.7 m$^3$ (mixing portion of about 0.6 m$^3$, separation portion of about 1.0 m$^3$ and bottom cone about 0.1 m$^3$), was passed a tall oil soap mixture obtained by mixing together 1300 kg/h of tall oil skimmings separated from black liquor and 560 kg/h of 30-% sulfuric acid the mixture containing 45% of tall oil (density 960 kg/m$^3$), 45% of mother liquid (density 1106 kg/m$^3$, pH 3.2) and 8% of lignin (density 1060 kg/m$^3$) as well as 2% of gypsum, at a rate of 1860 kg per hour, at 90° C. The mixture was passed tangentially through the pipe 19 into the mixing zone 3 of the device, wherein, by means of a circulating pump 2 tangentially connected to the mixing vessel, a rotary movement was imparted to the mixture in the space defined by the mantle 4 of said vessel and the cylinder 5 located in the center of said vessel. The intensity of the circulation was 23 m$^3$ per hour. From the top of the device the tall oil was discharged as overflow 8, 25, 26. The mother liquid and the lignin dispersed in same flowed into the discharge pipe 10 and were discharged through the bottom part of the device. The telescopic pipe 11 located in the upper portion of the discharge pipe 10 was adjusted so that the interface between the tall oil and the mother liquid was approximately at the level of the upper edge of the mixing portion.

The analysis of the separated tall oil was:
Tall oil: 97% by volume
Lignin: 3% by volume
Mother liquid: —
Gypsum: —
The analysis of the separated mother liquid was:
Tall oil: 2% by volume
Lignin: 1% by volume
Mother liquid: 96% by volume
Gypsum: 1% by volume

EXAMPLE 2

Into the separating device, described in Example 1, was passed a tall oil soap mixture obtained by mixing together 820 kg/h of tall oil skimmings separated from black liquor and 610 kg/h of spent acid derived from the preparation of chlorine dioxide (composition: sodium sulfate 360 g/l, sulfuric acid (100%) 456 g/l, and sodium chlorate about 3 g/l) and which mixture contained 55% of tall oil (density 960 kg/m$^3$), 40% of mother liquid (density 1106 kg/m$^3$, pH 2.2) and 5% lignin (density 1060 kg/m$^3$) as well as <1% of gypsum, at a rate of 1430 kg per hour, at 90° C. The mixture was passed tangentially into the mixing zone 3 of the device, wherein the intensity of the circulation was 19.5 m$^3$ per hour. From the top of the device the tall oil was discharged as overflow 8. The mother liquid and the lignin dispersed in same flowed into the discharge pipe 10 and were discharged from the bottom portion of the device. The telescopic pipe 11 located in the upper portion of the discharge pipe 10 was adjusted so that the boundary surface between the tall oil and the mother liquid was 0.1 m above the upper edge of the mixing portion.

The analysis of the separated tall oil was:
Tall oil: 98% by volume
Lignin: 2% by volume Mother liquid: —
Gypsum: —
The analysis of the separated mother liquid was:
Tall oil: 2% by volume
Lignin: 4% by volume
Mother liquid: 94% by volume
Gypsum: —

EXAMPLE 3

Into the separating device, described in Example 1, was passed a tall oil soap mixture obtained by mixing together 1715 kg/h of tall oil skimmings separated from black liquor and 415 kg/h of spent acid derived from the preparation of chlorine dioxide (composition: sodium sulfate 360 g/l, sulfuric acid (100%) 456 g/l, and sodium chlorate about 3 g/l) and which mixture contained 25% of tall oil (density 960 kg/m$^3$), 70% of mother liquid (density 1118 kg/m$^3$, pH 2.2) and 4% of lignin (density 1060 kg/m$^3$) as well as 1% gypsum, at a rate of 2130 kg per hour, at 94° C. The mixture was passed tangentially into the mixing zone 3 of the device, wherein the intensity of the circulation was 24 m$^3$ per hour. From the top of the device the tall oil was discharged as overflow 8. The mother liquid and the lignin dispersed in same flowed into the discharge pipe 10 and were discharged from the bottom part of the device. The telescopic part 11 located in the upper portion of the discharge pipe 10 was adjusted so that the interface between the tall oil and the mother liquid was 0.3 m above the upper edge of the mixing portion.

The analysis of the separated tall oil was:
Tall oil: 95% by volume
Lignin: 3% by volume
Mother liquid: 1% by volume
Gypsum: 1% by volume
The analysis of the separated mother liquid was:
Tall oil: 2% by volume
Lignin: 2% by volume
Mother liquid: 94% by volume
Gypsum: 2% by volume

EXAMPLE 4

Into a separating device having a volume of about 1.7 m$^3$ (mixing portion of about 0.6 m$^3$, separation portion of about 1.0 m$^3$ and bottom cone of about 0.1 m$^3$) was passed a mixture containing 32% of tall oil (density 950 kg/m$^3$), 62% of mother liquid (density 1100 kg/m$^3$, pH 3.0) and 6% of lignin (density 1060 kg/m$^3$) at a rate of 600 kg/h at 80° C. The mixture was passed tangentially through a pipe 19 into the mixing zone 3 of the device wherein, by means of a disposed recirculation pump 2, tangentially connected to the mixing vessel a rotary movement was imparted to the mixture in the space defined by the mantle 4 of said vessel and the cylinder 5 located in the center of said vessel. The rate of circulation was 16 m$^3$ per hour. From the top of the device the tall oil was discharged as overflow 8, 25, 26.

The mother liquid and the lignin dispersed therein flowed into a discharge pipe 10 and were discharged through the bottom of the device. The telescopic pipe 11 located in the upper portion of the discharge pipe 10 was adjusted so that the interface between the tall oil and the mother liquid was approximately at the level of the upper edge of the mixing portion.

The analysis of the separated tall oil was:
Tall oil: 98% by volume
Lignin: 1% by volume
Mother liquid: 1% by volume
Gypsum: —
The analysis of the separated mother liquid was:
Tall oil: 2% by volume
Lignin: 2% by volume
Mother liquid: 96% by volume
Gypsum: 1% by volume

EXAMPLE 5

Same separation device as in Example 4 was used, and same operations. The composition of the feed mixture was as follows:
30% by volume: tall oil (density 950 kg/m$^3$)
63% by volume: mother liquid (density 1105 kg/m$^3$, pH 3.0)
7% by volume: lignin (density 1060 kg/m$^3$)
Feed rate: 1000 kg/h
Feed temperature: 87° C.
Circulation rate: 17 m$^3$ per hour
The analysis of the separated tall oil was:
Tall oil: 99% by volume
Lignin: 1% by volume
Mother liquid: —
Gypsum: —
The analysis of the separated mother liquid was:
Tall oil: 2.0% by volume
Lignin: 3.0% by volume
Mother liquid: 95.0% by volume
Gypsum: —

EXAMPLE 6

Same separation device as in Example 4 was used, and same operations.

The composition of the feed mixture was as follows:
32% by volume: tall oil (density 950 kg/m$^3$)
60% by volume: mother liquid (density 1110 kg/m$^3$, pH 3.0)
8% by volume: lignin (density 1060 kg/m$^3$)
Feed rate: 1530 kg/h
Feed temperature: 87° C.
Circulation rate: 20 m$^3$ per hour.
The analysis of the separated tall oil was:
Tall oil: 98% by volume
Lignin: 1% by volume
Mother liquid: 1% by volume Gypsum: —
The analysis of the separated liquid was:
Tall oil: 2% by volume
Lignin: 3% by volume
Mother liquid: 95% by volume
Gypsum: —

EXAMPLE 7

Same separation device as in Example 4 was used, and same operations.

The composition of the feed mixture was as follows:
24% by volume: tall oil (density 950 kg/m$^3$)
65% by volume: mother liquid (density 1095 kg/m$^3$, pH 2.3)
11% by volume: lignin (density 1060 kg/m$^3$)
Feed rate: 1570 kg/h
Feed temperature: 90° C.
Circulation rate: 20 m$^3$ per hour.
The analysis of the separated tall oil was:
Tall oil: 99% by volume
Lignin: 1% by volume
Mother liquid: —
Gypsum: —
The analysis of the separated mother liquid was:
Tall oil: 2% by volume Lignin: 3% by volume
Mother liquid: 95% by volume
Gypsum: —

EXAMPLE 8

Same separation device as in Example 4 was used, and same operations.
The composition of the feed mixture was as follows:
26% by volume: tall oil (density 950 kg/m$^3$)
67% by volume: mother liquid (density 1095 kg/m$^3$, pH 2.8)
6% by volume: lignin (density 1060 kg/m$^3$)
Feed rate: 2200 kg/h
Feed temperature: 88° C.
Circulation rate: 21 m$^3$ per hour.
The analysis of the separated tall oil was:
Tall oil: 98% by volume
Lignin: 1% by volume
Mother liquid: 1% by volume
Gypsum: —
The analysis of the separated mother liquid was:
Tall oil: 4% by volume
Lignin: 2% by volume
Mother liquid: 94% by volume
Gypsum: —

EXAMPLE 9

Into a separating device was passed a crude tall oil water mixture obtained by mixing 490 kg/h of crude tall oil and 110 kg/h of hot water as well as 0.4 kg/h of 100% sulfuric acid. The composition of the feed mixture was as follows:
84% by volume: tall oil (density 950 kg/m$^3$)
8% by volume: washing water (density 980 kg/m$^3$, pH 3.2)
8% by volume: lignin
Feed rate: 600 kg/h
Feed temperature: 86° C.

The mixture was passed tangentially into the mixing zone 3 of the device wherein the rate of circulation was 20 m$^3$/h. From the top of the device the tall oil was discharged as overflow 8. The washing water and the lignin dispersed therein as well as other impurities flowed into a discharge pipe 10 and were discharged through the bottom of the device. The telescopic pipe 11 located in the upper portion of the discharge pipe 10 was adjusted so that the interface between the tall oil and the washing water was approximately at the level of the upper edge of the mixing portion. The analysis of the separated washed tall oil was:
Tall oil: 96% by volume
Lignin: 3% by volume
Washing water: 1% by volume
Gypsum: —
The analysis of the washing water used was:
Tall oil: —
Lignin: 2% by volume
Washing water: 98% by volume
Gypsum: —
The reduction in the ash content of the tall oil was 88%.

EXAMPLE 10

Same separation device as in Example 9 was used, and same operations.
The crude tall oil water mixture was obtained by mixing 550 kg/h of crude tall oil and 110 kg/h of hot water as well as 0.4 kg/h of 100% sulfuric acid.
The composition of the feed mixture was as follows:
80% by volume: tall oil (density 950 kg/m$^3$)
15% by volume: washing water (density 980 kg/m$^3$, pH 2.3)
5% by volume: lignin
Feed rate: 650 kg/h
Feed temperature: 87° C.
Circulation rate: 20 m$^3$ per hour.
The analysis of the separated washed tall oil was:
Tall oil: 99% by volume
Lignin: 1% by volume
Washing water: —
Gypsum: —
The analysis of the separated washing water was:
Tall oil: 1% by volume
Lignin: —
Washing water: 98% by volume
Gypsum: 1% by volume
The reduction in the ash content of the tall oil was 87%.

EXAMPLE 11

Same separation device as in Example 9 was used, and same operations.
The crude tall oil water mixture was obtained by mixing 630 kg/h of crude tall oil and 60 kg/h of hot water as well as 0.3 kg/h of 100% sulfuric acid.
The composition of the feed mixture was as follows:
95% by volume: tall oil (density 950 kg/m$^3$)
4% by volume: washing water (density 980 kg/m$^3$, pH 1.8)
1% by volume: lignin
Feed Rate: 690 kg/h
Feed temperature: 88° C.
Circulation rate: 20 m$^3$ per hour.
The analysis of the separated washed tall oil was:
Tall oil: 99% by volume
Lignin: 1% by volume
Washing water: —
Gypsum: —
The analysis of the separated washing water was:
Tall oil: 1% by volume
Lignin: 1% by volume
Washing water: 98% by volume
Gypsum: —
The reduction in the ash content of the tall oil was 91%.

EXAMPLE 12

Same separation device as in Example 9 was used, and same operations.
The crude tall oil water mixture was obtained by mixing 780 kg/h of crude tall oil and 55 kg/h of hot water as well as 0.5 kg/h of 100% sulfuric acid.
The composition of the feed mixture was as follows:
93% by volume: tall oil (density 950 kg/m$^3$)
4% by volume: washing water (density 980 kg/m$^3$, pH 2.1)
2% by volume: lignin
1% by volume: gypsum
Feed rate: 835 kg/h
Feed temperature: 96° C.
Circulation rate: 20 m$^3$ per hour.
The analysis of the separated washed tall oil was:
Tall oil: 98% by volume
Lignin: 1% by volume
Washing water: 1% by volume
Gypsum: —

The analysis of the separated washing water was:
Tall oil: 2% by volume
Lignin: 1% by volume
Washing water: 96% by volume
Gypsum: 1% by volume The reduction in the ash content of the tall oil was 86%.

EXAMPLE 13

Same separation device as in Example 9 was used, and same operations.

The crude tall oil water mixture was obtained by mixing 1450 kg/h of crude tall oil and 44 kg/h of hot water as well as 0.8 kg/h of 100% sulfuric acid.

The composition of the feed mixture was as follows:
95% by volume tall oil (density 950 kg/m$^3$)
3% by volume: washing water (density 980 kg/m$^3$, pH 1.5)
2% by volume: lignin
Feed rate: 1494 kg/h
Feed temperature: 85° C.
Circulation rate: 20 m$^3$ per hour.

The analysis of the separated washed tall oil was:
Tall oil: 97% by volume
Lignin: 1% by volume
Washing water: 2% by volume
Gypsum: —

The analysis of the separated washing water was:
Tall oil: —
Lignin: 1% by volume
Washing water: 99% by volume
Gypsum: —

The reduction in the ash content of the tall oil was 89%.

What is claimed is:

1. An apparatus for continuously separating liquid mixtures containing relatively heavy and lighter liquid fractions, solid impurities, and organic matter suspended therein and which is characterized by separation through rapid dynamic circulation and gravitation and by its efficient and dependable manner of operation comprising:

a vertically oriented vessel defining therewithin a mixing portion positioned generally centrally of said vessel, a separating portion disposed generally above said mixing portion, and a collection portion disposed below said mixing portion in generally the bottom of said vessel;

said mixing portion including liquid feed means, connected to said vessel, for tangentially introducing the liquid mixture to be separated into said mixing portion, a vertical cylinder axially mounted within the vessel and having an open lower terminal end disposed below the point of liquid mixture introduction into said vessel by said feed means, and liquid circulating means connected to said vessel for inducing a rapid rotary flow path for the liquid mixture about said vertical cylinder to induce the substantial separation of the liquid mixture into heavier and lighter liquid fractions to thereby form an organic matter containing interface, between said fractions in said vessel while dispersing a portion of the organic matter layer previously formed at the interface into the heavier fraction and to allow upward flow by gravitation of the heavier fraction into said vertical cylinder and the lighter fraction into said separating portion;

said separating portion including lighter liquid fraction discharge means connected to said vessel for transporting the separated lighter liquid fraction from the interior of said separating portion of said vessel, and a plurality of cones mounted within said vessel in said separating portion and positioned one inside the other in upright spaced apart relation with the walls of said cones at angles less than ninety degrees from the horizontal axis and defining a series of spaced apart passages between said cones extending generally from said mixing portion to said lighter liquid fraction discharge means for flow therethrough of the lighter liquid fraction and for reducing the quantity of heavier particles which may remain dispersed in said lighter liquid fraction following treatment of the liquid mixture in said mixing portion;

heavier liquid fraction discharge means connected to said vessel and including an insert portion having an inlet end for receiving liquid and being disposed within and in substantially concentric relation to said vertical cylinder so as to form a passageway at the lower terminal end of said vertical cylinder between the interior wall of said vertical cylinder and the exterior wall of the insert portion for transporting the heavier liquid fraction which flows through said passageway from the interior of said vessel; and said collection portion comprising impurity collection means for receiving solid impurities which settle out of the liquid mixture during operation of the apparatus.

2. Apparatus according to claim 1 wherein said plurality of cones are positioned so that the walls thereof lie at sixty degree angles from the horizontal axis.

3. Apparatus according to claim 1 further comprising level adjustment means for adjusting the level of said interface between the heavier and lighter liquid fractions within said vessel, and vent means for discharging gases and water vapor from the interior of said vessel.

4. Apparatus according to claim 3 wherein said level adjustment means comprise an adjustable telescoping pipe positioned above said inlet end of the heavier liquid fraction discharge means and adapted for regulating the volume of flow into said inlet to thereby adjust the level of the interface within the vessel.

5. Apparatus according to claim 3 wherein said level adjustment means comprises a limit switch operable for detecting movements of the interface outside of a predetermined operating level range and a control valve responsive to said limit switch for adjusting the flow through the heavier liquid fraction discharge means to thereby adjust the level of said interface.

6. Apparatus according to claim 3 further comprising impurity discharge means connected to said vessel having a receiving end positioned in the collection portion of said vessel and a discharge end outside of said vessel for removing impurities which collect in the bottom portion of said vessel.

7. An apparatus for continuously separating tall oil from acidified tall oil soap mixtures containing lignin suspended therein and which is characterized by separation through rapid dynamic circulation and gravitation and by its efficient and dependable manner of operation comprising:

a vertically oriented vessel defining therewithin a mixing portion positioned generally centrally of said vessel, a separating portion disposed generally above said mixing portion, and a collection portion disposed below said mixing portion in generally the bottom of said vessel;

said mixing portion including liquid feed means, connected to said vessel, for tangentially introducing the acidified tall oil soap mixture to be separated into said mixing portion, a vertical cylinder axially mounted within the vessel and having an open lower terminal end disposed below the point of acidified tall oil soap mixture introduction into said vessel by said feed means, and liquid circulating means connected to said vessel for inducing a rapid rotary flow path for the acidified tall oil soap mixture about said vertical cylinder to induce the substantial separation of the mixture into a spent acid fraction and a tall oil fraction to thereby form a lignin containing interface, between said fractions in said vessel while dispersing a portion of the lignin layer previously formed at the interface into the spent acid fraction and to allow upward flow by gravitation of the spent acid fraction into said vertical cylinder and the tall oil fraction into said separating portion;

said separating portion including tall oil fraction discharge means connected to said vessel for transporting the separated tall oil fraction from the interior of said separating portion of said vessel, and a plurality of cones mounted within said vessel in said separating portion and positioned one inside the other in upright spaced apart relation with the walls of said cones at angles less than ninety degrees from the horizontal axis for defining a series of spaced apart passages between said cones extending generally from said mixing portion to said tall oil fraction discharge means for flow therethrough of the tall oil fraction and for reducing the quantity of heavier particles which may remain dispersed in said tall oil fraction following treatment of the acidified tall oil soap mixture in said mixing portion;

spent acid fraction discharge means connected to said vessel and including an insert portion having an inlet end for receiving liquid and being disposed within and in subtantially concentric relation to said vertical cylinder so as to form a passageway at the lower terminal end of said vertical cylinder between the interior wall of said vertical cylinder and the exterior wall of the insert portion for transporting the spent acid fraction which flows through said passageway from the interior of said vessel; and said collection portion comprising impurity collection means for receiving solid impurities which settle out of the liquid mixture during operation of the apparatus.

8. Apparatus according to claim 7 wherein said plurality of cones are positioned so that the walls thereof lie at sixty degree angles from the horizontal axis.

9. Apparatus according to claim 7 further comprising level adjustment means for adjusting the level of said interface between the spent acid and tall oil fractions in the vessel, and vent means for discharging gases and water vapor from the interior of said vessel.

* * * * *